(12) United States Patent
Willems

(10) Patent No.: US 12,436,951 B2
(45) Date of Patent: *Oct. 7, 2025

(54) DYNAMIC OPERATOR PRUNING BASED ON STATE DEPENDENCIES AND INTERMEDIATE RESULTS

(71) Applicant: SAP SE, Walldorf (DE)

(72) Inventor: Paul Willems, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/761,828

(22) Filed: Jul. 2, 2024

(65) Prior Publication Data

US 2025/0028722 A1 Jan. 23, 2025

Related U.S. Application Data

(63) Continuation of application No. 18/355,010, filed on Jul. 19, 2023, now Pat. No. 12,061,603.

(51) Int. Cl.
*G06F 16/00* (2019.01)
*G06F 16/2453* (2019.01)
*G06F 16/2455* (2019.01)

(52) U.S. Cl.
CPC .... *G06F 16/24544* (2019.01); *G06F 16/2456* (2019.01)

(58) Field of Classification Search
CPC .................. G06F 16/24544; G06F 16/2456

USPC ........................................................ 707/714
See application file for complete search history.

(56) References Cited

U.S. PATENT DOCUMENTS

2018/0089270 A1* 3/2018 Qiu ................. G06F 16/24542
2023/0122781 A1* 4/2023 Shekhar ............ G06F 16/90335
707/769

* cited by examiner

*Primary Examiner* — Chelcie L Daye
(74) *Attorney, Agent, or Firm* — Mintz Levin Cohn Ferris Glovsky and Popeo, P.C.

(57) ABSTRACT

In some implementations, there is provided a method including generating a query plan including in a first pipeline a first join operator and in a second pipeline a second join operator; executing at least a portion of the query plan including the first pipeline and the first join operator; detecting, based on the at least one operator usage state and the at least one operator pruning condition, an empty state object shared between the first join operator and the second join operator in the second pipeline; and processing, by the at least one operator pruning condition, an indication of the empty state object, wherein the least one operator pruning condition is associated with the second join operator and includes at least a first rule to mark the second join operator for pruning.

20 Claims, 8 Drawing Sheets

DYNAMIC OPERATOR PRUNING BASED ON STATE DEPENDENCIES AND INTERMEDIATE RESULTS

CROSS REFERENCE TO RELATED APPLICATIONS

This application is a continuation of U.S. patent application Ser. No. 18/355,010 filed Jul. 19, 2023, entitled "DYNAMIC OPERATOR PRUNING BASED ON STATE DEPENDENCIES AND INTERMEDIATE RESULTS." The disclosures of which are incorporated herein by reference in their entirety.

TECHNICAL FIELD

The subject matter described herein relates generally to database processing and more specifically to database query optimization.

BACKGROUND

A database may be configured to store an organized collection of data. For example, data held in a relational database may be organized in accordance with a schema defining one or more relations, each of which being a set of tuples sharing one or more common attributes. The tuples of a relation may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, are provided for pruning of query plans. In some implementations, there is provided a method including generating a query plan including in a first pipeline a first join operator and in a second pipeline a second join operator, wherein the generating of the query plan further comprises defining at least one operator usage state and at least one operator pruning condition; executing at least a portion of the query plan including the first pipeline and the first join operator; detecting, based on the at least one operator usage state and the at least one operator pruning condition, an empty state object shared between the first join operator and the second join operator in the second pipeline; processing, by the at least one operator pruning condition, an indication of the empty state object, wherein the least one operator pruning condition is associated with the second join operator and includes at least a first rule to mark the second join operator for pruning, and marking the second join operator for pruning.

In some variations, one or more features disclosed herein including one or more of the following features may be implemented as well. A query may be received, wherein in response to the received query, the query plan is generated. The at least one operator usage state may identify the state object shared between the first join operator and the second join operator. The at least one operator usage state may indicate whether usage of the state object is read-only or read-write. The at least one operator pruning condition may indicate one or more conditions under which the second join operator can be pruned. The at least one pruning condition may indicate the first join operator as a source operator, a function that identifies whether the state object is empty, and a list of target operators to be pruned based on the function. One or more rules may be used to prune at least the second join operator and/or other operators in the first pipeline and the second pipeline. The one or more rules may include one or more of a direct pruning rule, a forward pruning rule, and a backward pruning rule. At least one database execution engine may perform the generating, the executing, the detecting, the processing, and the marking.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1A:
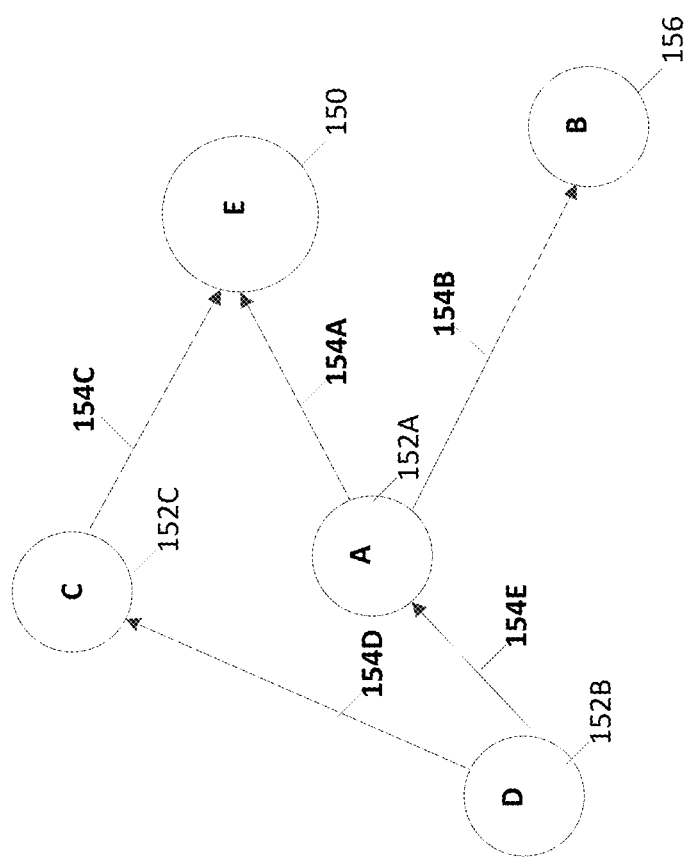
FIG. 1A illustrates an example of a portion of a directed acyclic graph for a pipeline, in accordance with some example implementations.

An in-memory relational database may utilize main memory for the primary storage of database tables. For example, the in-memory relational database may be implemented as a column-oriented database (or a columnar database) that stores data from database tables by columns instead of by rows. In the case of the in-memory column-oriented relational database for example, each tuple of a relation may correspond to a record occupying one row of a database table while the columns of the database table may store the values of the common attributes shared by multiple tuples, such that the values occupying each column of the database table (which may span multiple rows (or records) of the database table) may be stored sequentially in one or more data pages, with each data page storing at least a portion of a column. The in-memory column-oriented relational database may support efficient data compression and partitioning for massively parallel processing. Because the in-memory database is directly accessible by the central processing unit (CPU) of the computing engine, transactions accessing the in-memory database may be executed to provide near-instantaneous results.

The throughput and storage capacity of a database, such as an in-memory column-oriented relational database as well as other types of databases, may be maximized by distributing the processing and storage of data across multiple computing nodes. A single database table may therefore be divided into multiple partitions (or internal tables), for example, through one or more of hash partitioning, round-robin partitioning, and range partitioning, and stored across multiple computing nodes. Doing so may maximize opportunities for parallelization in which a single query is divided into multiple tasks and assigned to individual worker threads for parallel execution. As used herein, the term "worker thread" refers to a thread or thread of execution, which is a sequence of instructions managed independently by a scheduler. Individual worker threads (e.g., the corresponding sequences of instructions) may be scheduled for sequential execution and/or parallel execution by one or multiple central processing units (CPUs).

In a parallelization framework, a database execution engine (which may also be referred to as a query execution engine or an execution engine, for short) may divide a query accessing a dataset (e.g., one or more database tables) into a quantity of tasks determined based on the quantity of time required to execute the query on a portion of the dataset. As such, if a large quantity of time is required to execute the query on the portion of the dataset, the database execution engine may determine that the query is computationally intensive and thus divide the query into a larger quantity of smaller tasks. Meanwhile, the quantity of worker threads allocated to execute the query may be determined based on the progress of the query observed at various time intervals. For instance, upon allocating an initial quantity of worker threads to perform the tasks associated with the query, the database execution engine may monitor the progress of the query (e.g., the quantity of tasks that have not been performed by any worker threads, the quantity of tasks that have been performed relative to the total quantity of outstanding tasks, and/or the like) to determine whether to increase that initial quantity of worker threads.

Moreover, the database execution engine may also use pipelining. In the case of pipelining, the database execution engine breaks up data into smaller chunks of data, such that each smaller chunk of data can be processed by a series of one or more operators of a given pipeline. The operators refer to low-level operators, such as code that performs a specific operation during operator execution, rather than a high-level relational algebra operator. For example, the low-level operator may implement a lock on a database table, perform an index scan, perform a table scan at a given database, perform a limit operation (e.g., LimitOp), and/or other operations. During query plan generation and optimization, these low-level operators may be connected with each other to form a graph, such as a directed acyclic graph (DAG). Operators with no outgoing links may split the DAG up into multiple pipelines. For example, a pipeline ends on an operator with no outgoing links and starts with an operator after the previous pipeline ended. Pipeline execution may be performed in a recurrent fashion, such that operator "n" of the pipeline takes a chunk of data as input, performs its operation ("n") on the input data, and then the operator "n" pushes its corresponding output to the next operator "n+1". After the last operator in the pipeline is done performing its operation, control is returned to a prior operator. For example, when operator n+1 is finished, execution control may return to a prior operator n. The operator n may (or may not) continue processing (for example, producing another piece of data and pushing it down the pipeline of operators, performing a cleanup task, freeing resources, and/or the like). In other words, the pipeline represents a set of data processing elements (e.g., operators) connected such that the output of one element of the pipeline is the input of the next element of the pipeline, and buffer storage may be used between the elements. In some instances, the operators of a pipeline can be executed in parallel, serially, or in time-sliced fashion.

When a query is received by a database execution engine for example, a relational plan (also referred to as relational query plan or a relational algebra tree) may be generated by the database execution engine, and then an executable query plan is generated by the database execution engine. In the case of "pruning," this refers to avoiding access to (e.g., not executing) at least a portion of a query execution plan. For example, given a partitioned table T created by the following:

CREATE TABLE T (N INTEGER) PARTITION BY RANGE (N) (PARTITION 1<=VALUES<100, PARTITION 100<=VALUES<200)

and received query statements:

(1) SELECT * FROM T WHERE N<100
(2) SELECT * FROM T WHERE N<?, during the execution of query (1) for example, when the query plan is compiled to form the query execution plan, so called "compile time pruning" can determine that the second partition of the table T (which is partitioned with a value range between 100 and 200) does not have to be accessed; in other words, the pruning avoids the query operations associated with accessing of the second partition and this pruning can be performed when the query plan is compiled since the SELECT at statement (1) is a static parameter or value (e.g., N<100). During the execution of query (2) for example, so-called "runtime pruning" is used as the value of the parameter "?" will not be known until runtime. During runtime (e.g., execution of the query execution plan comprising one or more operators), the parameter "?" becomes known, and, as such, the now known parameter can be used to decide whether pruning can be performed. For example, if the parameter of "?" turns out to be less than 100 at runtime, the runtime pruning may be used to avoid the query operations associated with accessing of the second partition (which is between 100 and 200) of the table.

In the case of "dynamic pruning" however, the pruning of at least one part of a query execution plan is based on at least "intermediate results." The intermediate results refer to information obtained during execution of the query plan (e.g., data output by an operator of the query plan, data input to an operator of the query plan, information in a state object, and/or the like). In other words, all of the information required for runtime pruning is available at the start of query execution, while in the case of dynamic pruning some of the information needed for pruning only arises at varying points during query execution (if at all).

When a query is received by a database execution engine, plan generation transforms the relational plan (which may be an output of a query optimizer of the database execution engine) into an executable query plan, which may be in the form of a directed acyclic graph (DAG) of operators. A first sequence of operators of that query plan may be configured into (e.g., form) a first pipeline; a second sequence of operators of that query plan may be configured into a second pipeline; and so forth to form one or more pipelines.

During execution of the query plan ("query plan execution"), the execution of the query plan proceeds by executing a first start operator ("pipeline start operator") of the first pipeline, then the second start operator of a second pipeline, and so forth through the pipelines (e.g. by calling a "run( )" function on a corresponding pipeline start operator). During query plan execution, an operator of a pipeline may push, as noted, data to other operators along its outgoing one or more links, which triggers execution of one or more other operators in the query plan. FIG. 1A illustrates an example of a portion of a directed acyclic graph for a pipeline where the circles correspond to operators 150, 152A-C, and 156, which are connected by links 154A, 154B, 154C, 154D, and 154E. For example, operator D 152B pushes a chunk of data as an output via links 154D and 154E towards operators C 152C and operator A 152A. Likewise, operators C 152C receives that data chunk and provides a data chunk output on link 154C to operator E 150. In this way, the operators push data in chunks via the links to other operators, which in turn perform a function/operation and push their corresponding output on a corresponding link. In other words, the operators of a pipeline may, as noted, form or represent a directed acyclic graph, and each operator may have one or more outgoing links (which are used to push data) to one or more other operators. Likewise, each operator may have one or more incoming links (which provide data to the operator) from one or more other operators. In the example of FIG. 1A, operator C 152C is said to link to operator E 150 as operator C pushes data via link 154C to operator E.

For a database execution engine that executes pipelines of operators, an operator of the query plan may push data as a packet (e.g., one chunk of data at a time for processing before another chunk is sent) towards one or more other operators. By contrast, when pipelining is not used, all of the data is pushed at once towards the other operator(s). Although some of the examples herein refer to pipelining, the dynamic pruning disclosed herein may also be used with a non-pipelined execution of operators.

Figure 1C:
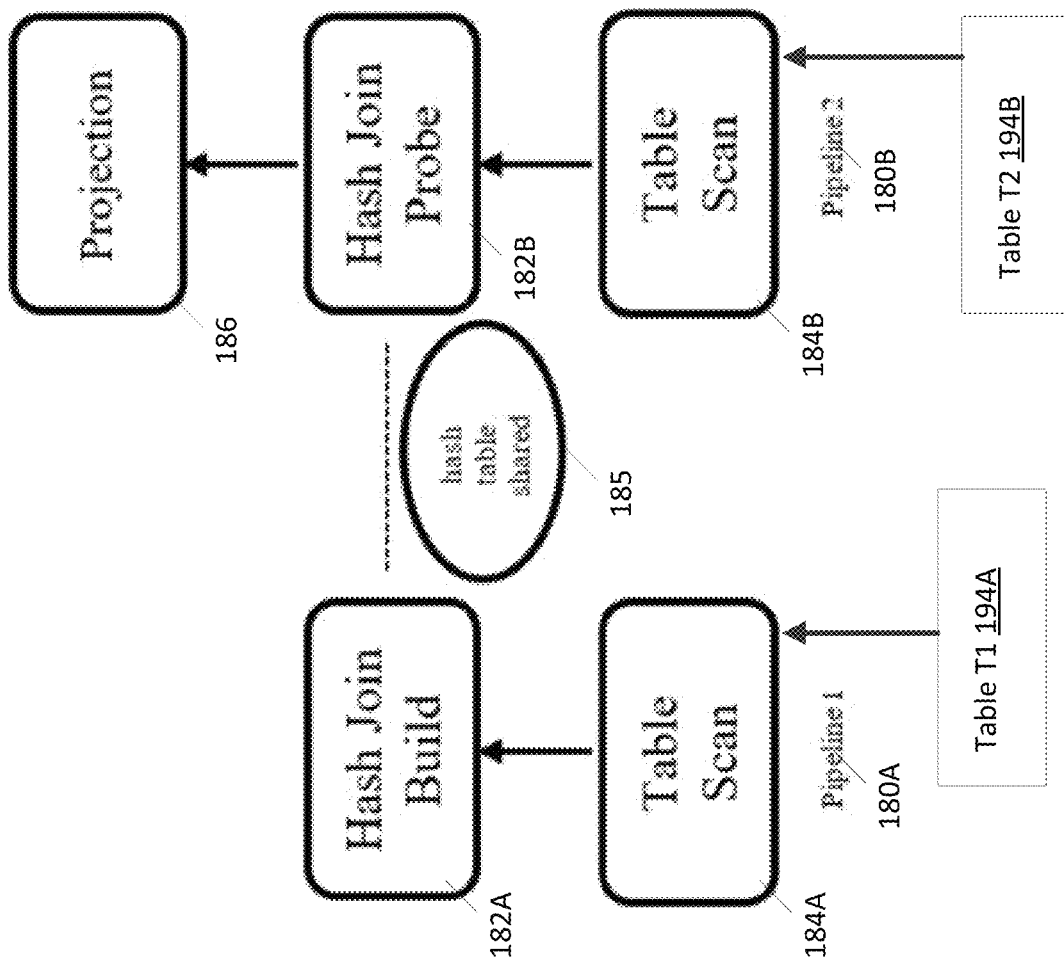
FIG. 1B-1C depict examples of query plans, in accordance with some example implementations.
Figure 1B:
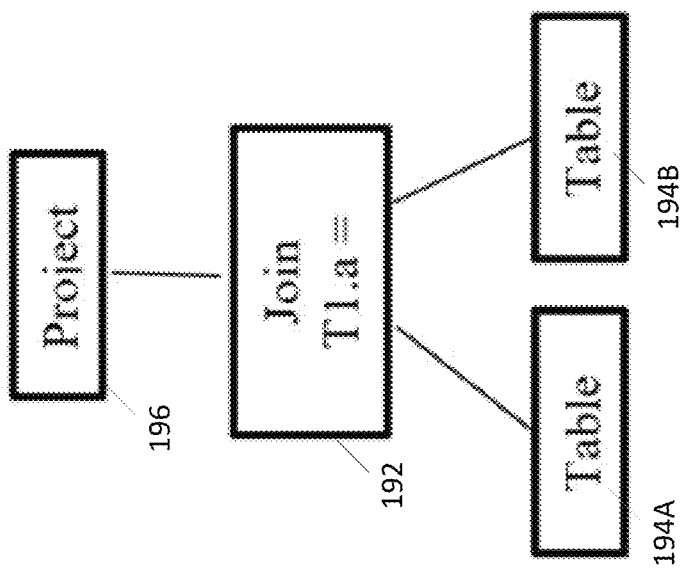

FIG. 1B depicts an example of a relational query plan (also referred to as relational algebra query plan) where the join 192 combines (based on a predicate value "a" matching) a first table 194A and a second table 194B, and uses a projection 196 to project the result of the join. As noted above, the relational query plan is transformed into an executable query plan, an example of which is shown at FIG. 1C.

In the example of FIG. 1C, the database execution engine (or the query optimizer therein) chooses to optimize using a hash join and using a first pipeline 180A and a second pipeline 180B. A hash join is a type of join that is used to find matches in two tables with a hash table. In the case of the hash join, it is performed with a build side (e.g., hash join build 182A) that collects the incoming rows from a first table 194A and builds a hash table 185, and a probe side (e.g., hash join probe 182B) that takes the incoming rows from a second table 194B and contains the logic to look into (i.e., probe) the hash table 185 built by the hash join build 182A to determine the matches for the join. At runtime, the hash join build 182A operator and the hash join probe 182B operator both use an object, such as a state object (which in this example is the hash table object 185). In other words, the hash table object 185 is a state object (i.e., an object that stores runtime information such as the state of the hash table) and in particular a shared state object as both operators (e.g., hash join build 182A and hash join probe 182B) use that state object, such as the hash table 185 during runtime.

In the example of FIG. 1C, the query plan includes, as noted, two pipelines, a first pipeline (Pipeline 1) 180A and a second pipeline (Pipeline 2) 180B, where the data flows from the bottom operators towards the top operators. In this example, the first pipeline's start operator is the table scan 184A, and the second pipeline's start operator is the table scan 184B. And, the first pipeline 180A includes the build side, such as the hash join build 182A, that has to execute completely before the second pipeline 180B can start execution.

During query plan execution, the input to the hash join build 182A may be empty, which may be caused due to a variety of reasons, such as the whole first table (T1) 194A is empty, the first table (T1) 194A has no visible rows, or the table scan 184A on the first table (T1) 194A contains a filter that filters out all rows of the first table (T1) 194A. Since the hash join is an inner equi-join, if the input to the hash join build is empty, there will be no results for the hash join. As such, it would be a waste of compute and/or processing resources to access the second table (T2) 194B at all or even start processing and filtering the rows of table T2 using a table scan 184B or performing the hash join probe 182B. In the example of FIG. 1C, the operators of the second pipeline 180B, such as the table scan 184B operator, do not know (e.g., have any information or indication) regarding the empty input (e.g., at the hash table 185) to the hash join build 182A.

Although some of the examples refer to a join having a relatively simple join condition (e.g., a=b) which is implemented as a hash join, other types of join conditions, join algorithms (e.g., nested loop, etc.), and/or join types (e.g., left outer join, semi join, inner join, and/or the like except for those joins where rows in the result do not require a match on the left/build side such as right outer, full outer, or right anti-semi joins) may be used as well with the dynamic optimization disclosed herein.

In some implementations, there is provided dynamic pruning. Dynamic pruning takes into account an intermediate result, such as an output of the table scan operator 184A, the contents of an object (e.g., a state object, such as hash table 185), and/or the like, to determine what (if any portions) of the query plan to prune. As noted, the intermediate result is not known until execution of the query plan.

Figure 1D:
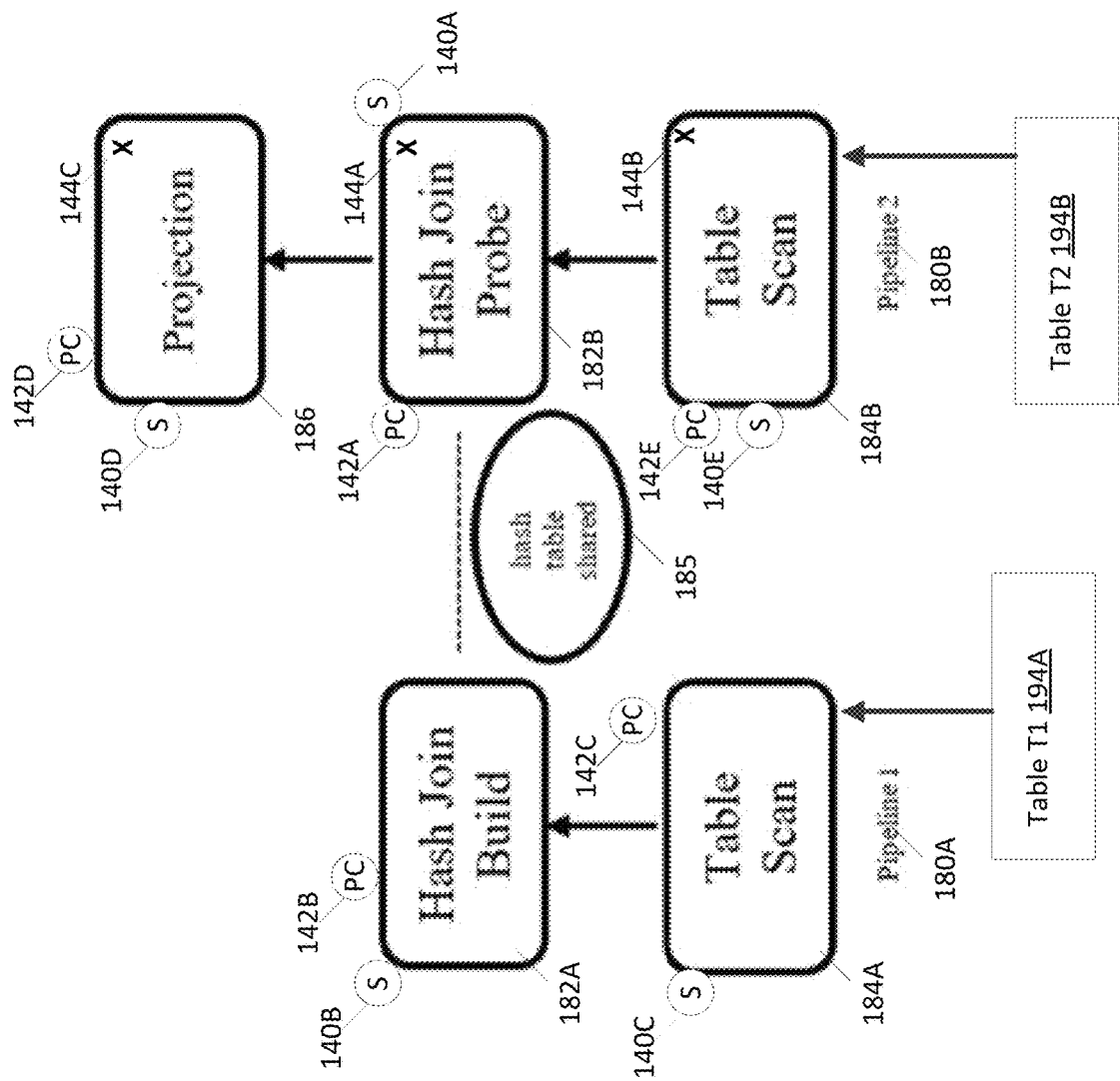
FIG. 1D depicts the query plan of FIG. 1C annotated to show state object usage and pruning conditions, in accordance with some example implementations.

In some implementations, the dynamic pruning includes the use of an operator's runtime state usage. The phrase "state usage" refers to which state object(s) (which as noted refers to a state storing runtime properties of an operator) is/are used during runtime by the operator. For each operator for example, the operator's state usage may include which state object(s) are being used by the operator, and whether that usage is read-only or read-write. The operator's state usage of state objects during runtime may be declared during plan generation (e.g., declared as part of the operator's "state"). FIG. 1D depicts the pipelines of FIG. 1C but further shows the state usage 140A-E of the operators. For example, the state usage 140A of hash join probe 182B may include state usage of at least the hash table 185, and the state usage 140B of hash join build 182A may include state usage of at least the hash table 185. And, in the example of FIG. 1D, the other operators may declare (during plan generation) their state as shown at 140C-E.

In some implementations, the dynamic pruning also includes the use of pruning conditions. For example, an operator can declare its pruning conditions. The "pruning condition" defines one or more conditions under which an operator can be pruned. For example, the pruning condition may be defined using a tuple. The tuple may include at least one source operator (sourceOp), a function F, and a list of target operators (targets). The function (F) may access states used by the source operator, and the function (F) can be executed after the source operator(s) has run to completion. If the function F returns true for example, all of the operators in the targets operators list can be declared (e.g., marked) as pruned.

In the example of FIG. 1D, a pruning condition with a sourceOp of hash join build operator 182A, condition "has table empty" (with respect to hash state table 185), and a single target operator of hash join probe 182B may be used.

To illustrate further using the example of FIG. 1D, during plan generation, the hash join build 182A operator ("B") is added to the query plan and the hash join probe 182B operator ("P") is added as well along with other operators. And as part of the plan generation, a pruning condition (PC) may be added of the form: (B, F_hj, P), wherein B represents the source operator (which in this example is the hash join build 182A), P represents a list of one or more target operators (which in this example is the hash join probe 182B, the table scan 184B, the projection 186), and a function F_hj is a function that checks the hash table state 185 and returns whether the hash table state 185 is empty. In the case of FIG. 1D, the PC 142A for the source operator B (which in this example is the hash join probe 182B), the function (F) as noted checks the state object, such as hash table 185, to determine whether or not it is empty (i.e., does not include intermediate results from the table scan 184A or hash join build 182A). If the function F returns true that the state object, such as hash table 185, is empty, the operators in the targets operators list can be marked as pruned. Given the target operators (P) include a list of one or more target operators (which in this example include the table scan 184B, the hash probe join 182B, and the projection 186), these target operators can be marked for pruning as shown by the "X" 144A-C.

Figure 1E:
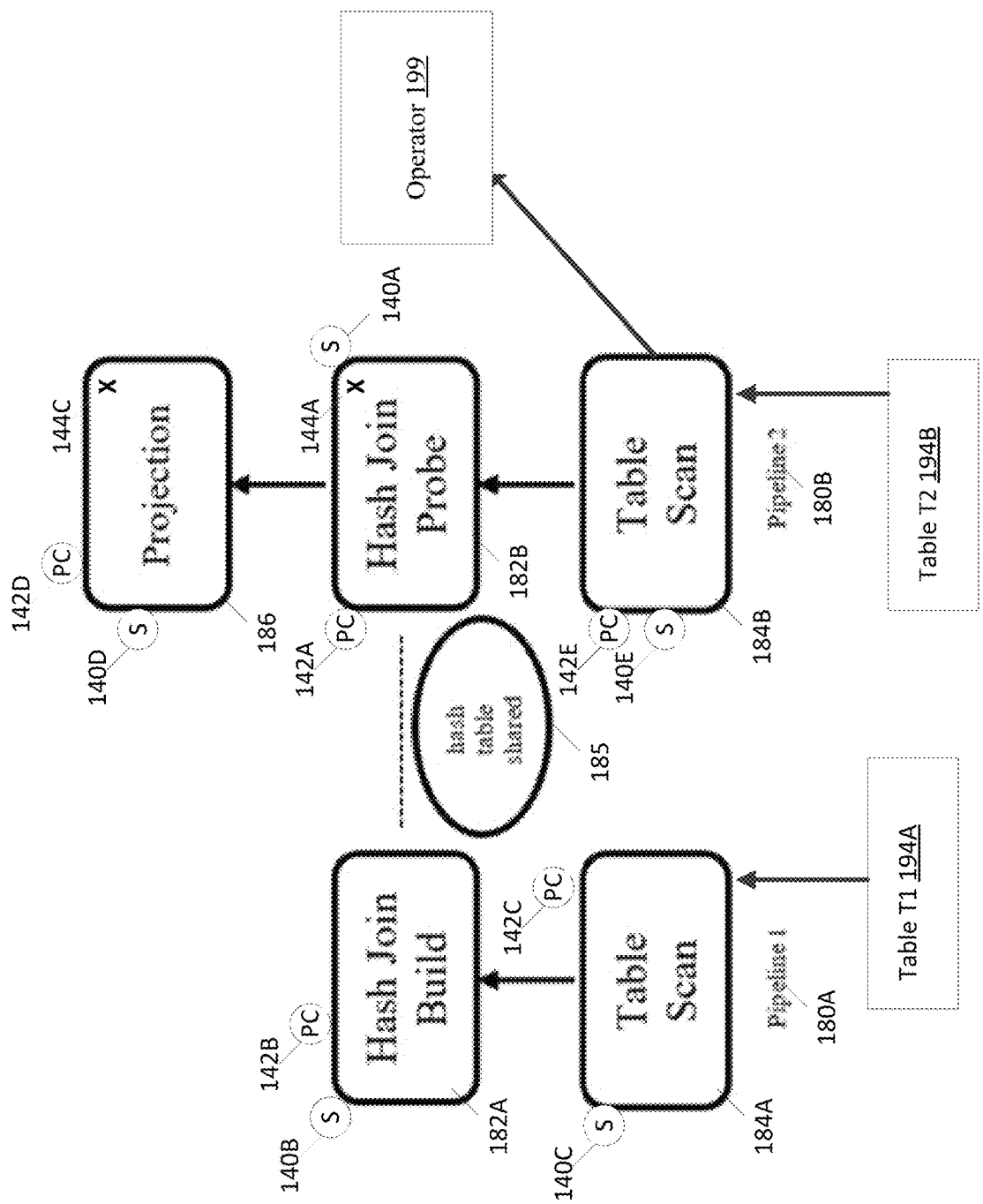
FIG. 1E depicts the query plan of FIG. 1D annotated to show an additional operator, in accordance with some example implementations.

When an operator is marked for pruning, it may (or may not) be actually pruned during execution. For example, if the operator marked for pruning is needed by another operator not being pruned, the marked operator might not be pruned for execution. Referring to FIG. 1E for example the hash join probe 182A is marked for pruning, the table scan operator 184B cannot be marked for pruning (or if marked, the table scan operator 184B cannot be pruned) because the table scan operator 184B output is needed elsewhere, such as by the operator 199.

In some implementations, one or more rules may be used to determine whether to mark an operator as pruned. In other words, the one or more rule may be used to propagate a pruned operator to other operators. A rule may for example provide direct pruning when a pruning condition (PC) for an operator is evaluated at runtime and the PC indicates the operator can be pruned. Alternatively, or additionally, a rule may provide forward pruning, such that an operator can be pruned if all of the operators linking to it can be pruned. Referring to FIG. 1E, in the case of forward pruning, if the table scan operator 184B can be pruned (based for example on a pruning condition defined on the table scan operator 184B or based on runtime pruning, or even itself derived from the application of pruning rules), both the hash join probe operator 182B and the other operator 199 can be pruned. The forward pruning also prunes operators forward (e.g., in the direction of the data being pushed on the link as depicted by the arrow) of the operator being pruned, so the table scan operator 184B and the linked hash join probe operator 182B and the other operator 199. However as part of the one or more rules, additional pruning of operators, such as the hash join build operator 182A may also be derived as pruned (e.g., based on state usage and backward pruning). Alternatively, or additionally, a rule may provide backward pruning. In the case of backward pruning, an operator R can be pruned if both (1) and (2) are true as follows: (1) all operators that the operator links to are pruned and (2) for each state (e.g., object state) S that the operator R has read-write access to, all of the other operators T that read the same state S and execute after R (e.g., reachable from R or in another, later pipeline than R) can be pruned. For backward pruning, we look at the outgoing links, so in the case of hash join probe operator 182A, it does not have any outgoing links. Referring again to FIG. 1E, the hash join build operator 182A can be pruned from backward pruning if hash join probe 182B is pruned (for any reason) because operator 182A has no outgoing links (condition (1) satisfied) and all operators reading the only state hash join probe 182B writes to (e.g., the hash table 185) are pruned. Referring to FIG. 1D, after determining that the hash join probe 182B is pruned from the pruning condition on the hash table being empty, the backward pruning rule allows derives that the table scan 184B can be pruned (as table scan operator 184 has no state that it writes and only one link to the pruned operator 182B).

Table 1 below provides a summary of the noted pruning rules.

TABLE 1

| | |
|---|---|
| Direct Pruning | An operator can be pruned if a pruning condition evaluated during runtime says so. |
| Forward Pruning | An operator can be pruned if all operators it links to can be pruned. |
| Backward Pruning | An operator R can be pruned if both of the following are true:<br>a. All operators that the operator links to are pruned. |

TABLE 1-continued b. For each state S that the operator R has read-write access to, all operators T that read the same state S and execute after R (reachable from R or in in a later pipeline than R) are pruned.

Although Table 1 depicts some rules, there may be other types of rules including exceptions to pruning. For example, an operator (which has side effects other than modifying a state or pushing data) might be exempted from being pruned (in which case the PC may explicitly state no pruning for the operator). Although FIG. 1D shows all of the operators as having pruning conditions 142A, 142B, and so forth, some but not all of the operators may have pruning conditions. Likewise, although FIG. 1D shows all of the operators with state usage 140A, 140B and so forth, some but not all of the operators may have statue usage. Based on repeated application of the rules, the "pruned" state of one or more operators can be propagated back and forward through the pipelines to determine which operators can be pruned, and the propagation may occur upon evaluation of a pruning condition. If a pipeline start operator gets marked as pruned before the execution of the pipeline is started for example, the execution of the whole pipeline can be skipped completely (in other words, the whole pipeline is pruned).

Before providing additional description regarding the pruning disclosed herein, the following provides description regarding an example database management system in which the pruning can be practiced.

Figure 2A:
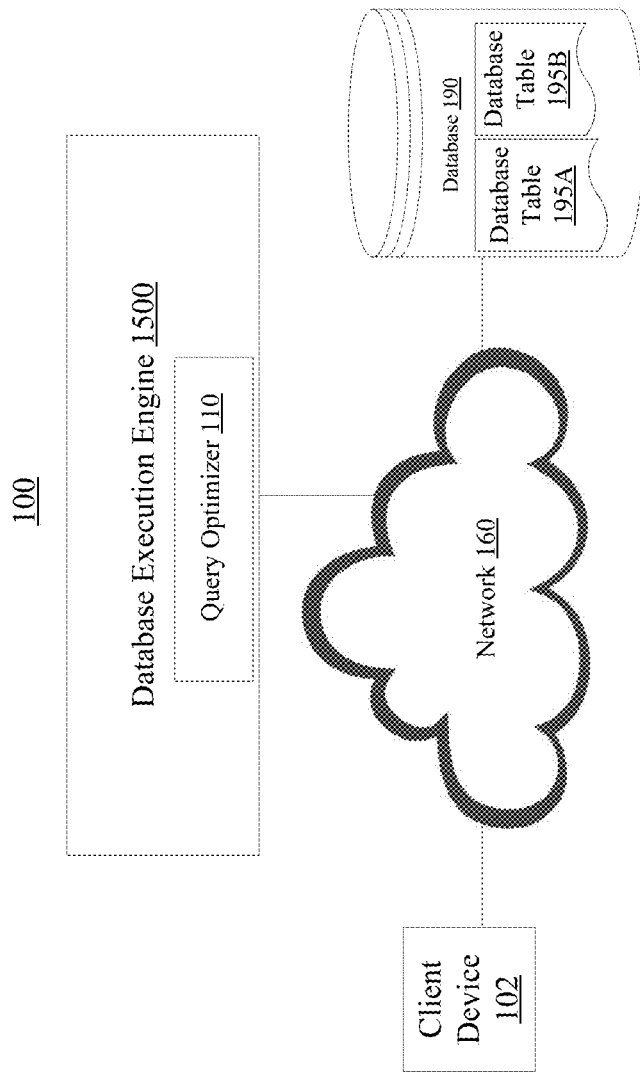
FIGS. 2A and 2B depict examples of systems including a database execution engine configured to provide dynamic optimization, in accordance with some example implementations.

FIG. 2A depicts a system diagram illustrating an example of a system 100, in accordance with some example implementations. Referring to FIG. 2A, the system 100 may include one or more client devices such as client device 102, a database execution engine 1500, and one or more databases, such as database 190. As shown in FIG. 2A, the one or more client devices 102, the database execution engine 1500, and the one or more databases 190 (which may include one or more database tables 195A-B) may be communicative coupled via a network 160.

The one or more databases 190 may include a variety of relational database technologies including, for example, an in-memory database, a column-based database, a row-based database, hybrid database (e.g., combination of column and row based), and/or the like. The one or more client devices 102 may include processor-based devices including, for example, a mobile device, a wearable apparatus, a personal computer, a workstation, an Internet-of-Things (IoT) appliance, and/or the like. The network 140 may be a wired network and/or wireless network including, for example, a public land mobile network (PLMN), a local area network (LAN), a virtual local area network (VLAN), a wide area network (WAN), the Internet, and/or the like.

Figure 2B:
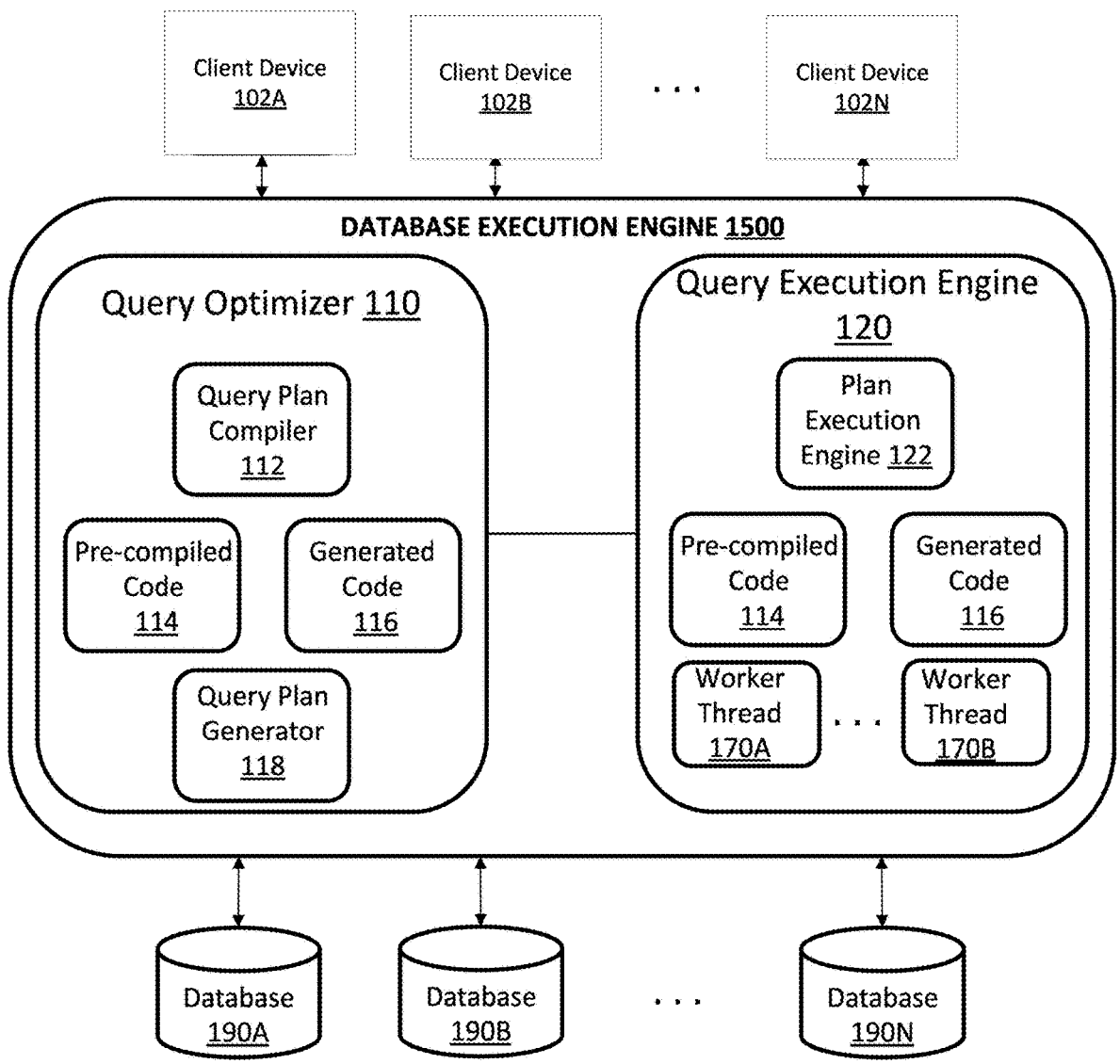

FIG. 2B depicts a block diagram illustrating an example implementation of the database execution engine 1500, in accordance with some example implementations. As shown in FIG. 2B, the one or more databases 190 (which may include a first database 190A, a second database 190B, and a third database 190C) may represent a database layer of a database management system (DBMS) where data may be persisted and/or stored in a structured way, and where the data may be queried or operated on using operations such as SQL commands or other types of commands/instructions to provide reads, writes, and/or perform other operations. To illustrate by way of an example, the one or more client devices 102 (which may include the client devices (e.g., client user equipment) 102A-N) may send a query via the database execution engine 1500 to the database layer including the one or more databases 190, which may represent a persistence and/or storage layer where database tables may be stored and/or queried. The query may be sent via a connection, such as a wired connection and/or wireless connection (e.g., the Internet, cellular links, Wi-Fi links, and/or the like) provided, for example, by the network 160.

The database execution engine 1500 may include a query optimizer 110, such as an SQL optimizer and/or another type of optimizer, to receive at least one query from the one or more client devices 102 and generate a corresponding query plan (which may be optimized) for execution by a query execution engine 120. The query optimizer 110 may receive a request, such as a query, and then form or propose an optimized query plan. The query plan (which may be optimized) may be represented as a so-called "query algebra" or "relational algebra" and may be in the form of a directed acyclic graph. The query plan may propose an optimum query plan with respect to, for example, the execution time of the overall query. To optimize a query, the query plan optimizer 110 may obtain one or more costs for the different ways the execution of the query plan may be performed, and the costs may be in terms of execution time at, for example, the one or more databases 190.

A query plan compiler 112 may enable compilation of at least a portion of the query plan. The query plan compiler 112 may compile the optimized query algebra into operations, such as program code and/or any other type of command, operation, object, or instruction. This code may include pre-compiled code 114 (which may be pre-compiled and stored and then selected for certain operations in the query plan) and/or generated code 116 generated specifically for execution of the query plan. For example, the query plan compiler 112 may select pre-compiled code 114 for a given operation as part of the optimization of the query plan, while for another operation in the query plan the query plan compiler 112 may allow a compiler to generate the code (i.e., generated code 116). The pre-compiled code 114 and the generated code 116 represent code for executing the query plan, and this code may be provided to a query plan generator 118, which interfaces with the query execution engine 120.

The query optimizer 110 may optimize the query plan (which may include the noted pipelines of operators) by compiling and generating code. Furthermore, the query optimizer may generate a DAG including operators that may be configured into one or more pipelines. Moreover, the query optimizer 110 may optimize the query plan to enable pipelining during execution. The query execution engine 120 may receive, from the query plan generator 118, compiled code to enable execution of the optimized query plan, although the query execution engine 120 may also receive code or other commands directly from a higher-level application or another source such as the one or more client devices 102. The pre-compiled code 114 and/or the generated code 116 may be provided to a plan execution engine 122 of the query execution engine 120. The plan execution engine 122 may then prepare the plan for execution, and this query plan may include the pre-compiled code 114 and/or the generated code 116. When the code for the query plan is ready for execution during runtime, the query execution engine 120 may step through the code, performing some of the operations within the database execution engine 1500 and sending some of the operations (or commands in support of an operation, such as a read, write, and/or the like) for execution at one or more of one or more database 190A-N.

The query execution engine 120 may, as noted, be configured to handle different types of databases and the corresponding persistent layers and/or tables therein. For example, the one or more databases 190 may include at least one row-oriented database, in which case an insert is performed by adding a row with a corresponding row identifier. Alternatively and/or additionally, where the one or more databases 190A-N include one or more column store databases, which may use dictionaries and compressive techniques when inserting data into a table. Where the database layer includes multiple different types of databases, the query execution engine 120 may perform execution related to handling the differences between different types of databases such as row-oriented databases and column store databases. This may enable a reduction in processing at the database layer, for example, at each of the one or more databases 190A-N. Moreover, the query execution engine 120 may perform other operations including rule-based operations, such as joins and projections, as well as filtering, group by, multidimensional analysis, and/or the like to reduce the processing burden on the database layer. In this way, the query execution engine 120 may execute these and other complex operations, while the one or more databases 190A-N can perform simpler operations to reduce the processing burden at the one or more databases 190A-N.

The query execution engine 120 may run, as noted above, the generated code 116 generated for some query operations, while the pre-compiled code 114 may be run for other operations. Moreover, the query execution engine 120 may combine the generated code 116 with the pre-compiled code 114 to further optimize execution of query related operations. In addition, the query execution engine 120 may provide for a plan execution framework that is able to handle data chunk(s), pipelining, and state management during query execution. Furthermore, the query execution engine 120 may provide the ability to access table storage via an abstract interface to a table adapter, which may reduce dependencies on specific types of storage/persistence layers (which may enable use with different types of storage/persistence layers).

The database layer may provide distributed data storage in which the processing and storage of data is distributed across multiple nodes including, for example, the first database 190A, the second database 190B, the third database 190C, and/or the like. Accordingly, to store a database table 195 at the one or more databases 190, the database execution engine 1500 may divide the database table 195 into multiple partitions by applying one or more of a hash partitioning, round robin partitioning, and range partitioning.

Figure 3:
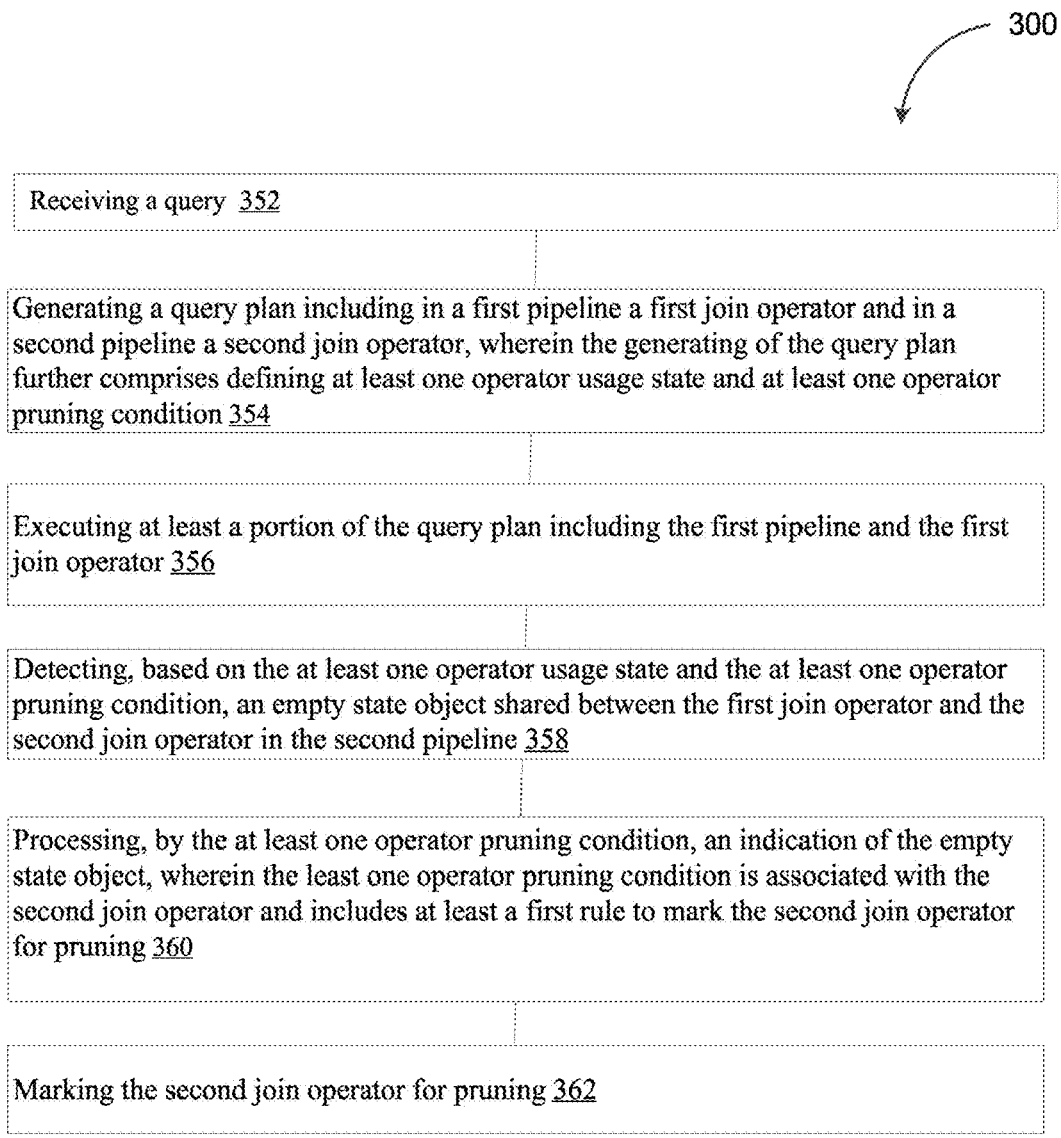
FIG. 3 depicts an example of a flow chart for dynamic query optimization, in accordance with some example implementations.

FIG. 3 depicts a flowchart illustrating an example of a process 300 for dynamic pruning, in accordance with some example implementations.

At 352, a query request is received. For example, the database execution engine 1500 may receive (e.g., from a client device 102A) a query such as join two tables, such as tables 194A-B of FIG. 1B.

At 354, a query plan is generated such that the query plan includes in a first pipeline a first join operator and in a second pipeline a second join operator, in accordance with some implementations. Moreover, the query plan generation may further include defining operator usage states and operator pruning conditions. For example, the database execution engine 1500 may generate a query plan that includes a first pipeline, such as pipeline 180A, and a second pipeline 180B, and in the first pipeline there are one or more operators, such as a first join operator, which in the example of FIG. 1D is the hash join build operator 182A. And, in in the second pipeline there are one or more operators, such as a second join operator, which in the example of FIG. 1D is the hash join probe operator 182B. The query plan generation may include defining operator usage states, such as usage states 142A-E depicted at FIG. 1D. Alternatively, or additionally, the query plan generation may include defining operator pruning conditions, such as pruning conducti After the query plan is generated, at least a portion of the query plan including the first pipeline and the first join operator may be executed at 356. For example, the database execution engine 1500 may execute one or more operators of the first pipeline, such as executable operators for the table scan 184A which pushes its output (if any) to the hash join build 182A, which during query execution writes to the state object, such as hash table 185. After the first pipeline is executed, the second pipeline (including one or more of its operators) may be executed by the database execution engine 1500 as well.

At 358, an empty state object shared between the first join operator and the second join operator in the second pipeline may be detected based on the at least one operator usage state and the at least one operator pruning condition. Referring to FIG. 1D for example, when the first pipeline 180A is executed, the table scan operator 184A may scan the first table 194A. As noted, if the output of the table scan 184A (or input to the hash build join 182A) is empty, the hash table 185 will be empty. When the state object (which in this example is hash table 185) is empty, this empty condition is detected (e.g., by the database execution engine). And, the empty condition for the state object is then processed. For example, the pruning condition (e.g., pruning condition 142A and/or 142B) may receive and/or process an indication of the empty state object (which in this example is hash table 185 is empty).

At 360, the at least one operator pruning condition may process an indication of the empty state object, wherein the least one operator pruning condition is associated with the second join operator and includes at least a first rule to mark the second join operator for pruning. For example, the database execution engine 1500 may during query plan execution check the state object, such as hash table 185, and determine whether the hash table 185 is empty. The database execution engine may (based on the operator usage state 140A (and/or 140B)) know that the first join operator (e.g., hash join build 182A) and the second join operator 182B share the state object. And, the database execution engine may also determine that it needs to check the state object as indicated by a pruning condition, such as the pruning condition 142A (and/or 142B). The pruning condition may also include a rule or function that indicates to mark the second join operator for pruning when the state object (e.g., hash table 185) is empty.

At 360, a second operator pruning condition may process an indication of the empty state object, such that the second operator pruning condition is associated with the second join operator and includes at least a first rule to mark the second join operator for pruning. Referring to FIG. 1D, the pruning condition 142A may also process the indication that the state object (e.g., hash table 185) is empty. As shown at FIG. 1D, the pruning condition 142A is associated with the second join, such as the hash join probe operator 182B. And the pruning condition 142A may include a rule to mark the second join operator (which is then marked for pruning as shown at 144A). Although the example refers to the associated pruning condition as pruning condition 142A, pruning condition 142B may also be considered to be associated with the hash join probe 182B as the pruning condition 1402B also includes rules regarding pruning of the hash join probe 182B.

A 362, the second join operator may be marked for pruning. As noted, the database execution engine may mark the hash join probe 182B for pruning. Moreover, t The pruning conditions including the direct, forward, and backward rules noted above may be used to propagate pruning of other operators of the first and/or second pipelines. For example, given the pruning of the hash join probe operator 182B at FIG. 1D, the table scan 184B and the projection 186 may be pruned.

Figure 4:
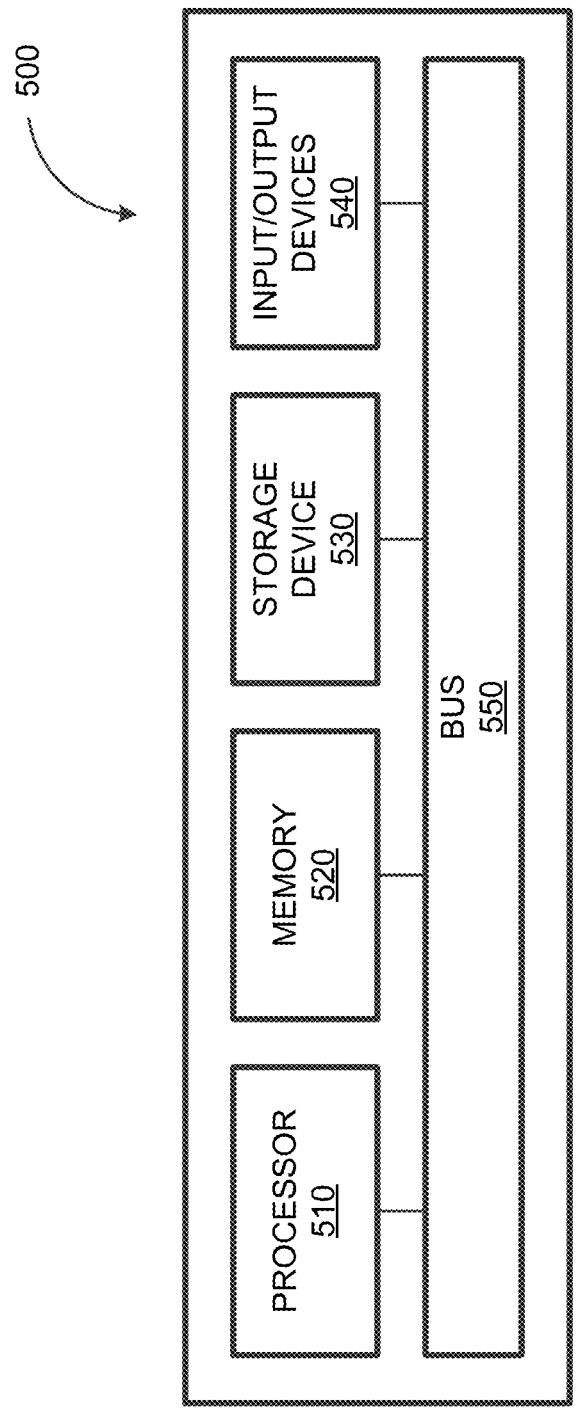
FIG. 4 depicts a block diagram illustrating an example of a computing system, in accordance with some example implementations.

FIG. 4 depicts a block diagram illustrating an example of a computing system 500 consistent with implementations of the current subject matter. Referring to FIGS. 1-4, the computing system 500 may implement the database execution engine 1500 and/or any components therein.

As shown in FIG. 4, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the database execution engine 1500. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A method comprising:
generating a query plan including in a first pipeline a first join operator and in a second pipeline a second join operator, wherein the generating of the query plan further comprises defining at least one operator usage state and at least one operator pruning condition;
executing at least a portion of the query plan including the first pipeline and the first join operator;
detecting, based on the at least one operator usage state and the at least one operator pruning condition, an empty state object shared between the first join operator and the second join operator in the second pipeline;
processing, by the at least one operator pruning condition, an indication of the empty state object, wherein the least one operator pruning condition is associated with the second join operator and includes at least a first rule to mark the second join operator for pruning, and
marking the second join operator for pruning.

Example 2: The method of Example 1 further comprising:
receiving a query, wherein in response to the received query, the query plan is generated.

Example 3: The method of any of Examples 1-2, wherein the at least one operator usage state identifies the state object shared between the first join operator and the second join operator.

Example 4: The method of any of Examples 1-3, wherein the at least one operator usage state indicates whether usage of the state object is read-only or read-write.

Example 5: The method of any of Examples 1-4, wherein the at least one operator pruning condition indicates one or more conditions under which the second join operator can be pruned.

Example 6: The method of any of Examples 1-5, wherein the at least one pruning condition indicates the second join operator as a source operator, a function that identifies whether the state object is empty, and a list of target operators to be pruned based on the function.

Example 7: The method of any of Examples 1-6 further comprising using one or more rules to prune at least the second join operator and/or other operators in the first pipeline and the second pipeline.

Example 8: The method of any of Examples 1-7, wherein the one or more rules include one or more of a direct pruning rule, a forward pruning rule, and a backward pruning rule.

Example 9: The method of any of Examples 1-8, wherein at least one database execution engine performs the generating, the executing, the detecting, the processing, and the marking.

Example 10: A system comprising:
at least one processor; and
at least one memory including instruction which when executed by the at least one processor causes operations comprising:
generating a query plan including in a first pipeline a first join operator and in a second pipeline a second join operator, wherein the generating of the query plan further comprises defining at least one operator usage state and at least one operator pruning condition;
executing at least a portion of the query plan including the first pipeline and the first join operator;
detecting, based on the at least one operator usage state and the at least one operator pruning condition, an empty state object shared between the first join operator and the second join operator in the second pipeline;
processing, by the at least one operator pruning condition, an indication of the empty state object, wherein the least one operator pruning condition is associated with the second join operator and includes at least a first rule to mark the second join operator for pruning, and
marking the second join operator for pruning.

Example 11: The system of Example 10 further comprising:
receiving a query, wherein in response to the received query, the query plan is generated.

Example 12: Example 1. The system of any of Examples 10-11, wherein the at least one operator usage state identifies the state object shared between the first join operator and the second join operator.

Example 13: The system of any of Examples 10-12, wherein the at least one operator usage state indicates whether usage of the state object is read-only or read-write.

Example 14: The system of any of Examples 10-13, wherein the at least one operator pruning condition indicates one or more conditions under which the second join operator can be pruned.

Example 15: The system of any of Examples 10-14, wherein the at least one pruning condition indicates the first join operator as a source operator, a function that identifies whether the state object is empty, and a list of target operators to be pruned based on the function.

Example 16: The system of any of Examples 10-15 further comprising using one or more rules to prune at least the second join operator and/or other operators in the first pipeline and the second pipeline.

Example 17: The system of any of Examples 10-16, wherein the one or more rules include one or more of a direct pruning rule, a forward pruning rule, and a backward pruning rule.

Example 18: The system of any of Examples 10-17, wherein at least one database execution engine performs the generating, the executing, the detecting, the processing, and the marking.

Example 19: A non-transitory computer-readable storage medium including instruction which when executed by at least one processor causes operations comprising:
  generating a query plan including in a first pipeline a first join operator and in a second pipeline a second join operator, wherein the generating of the query plan further comprises defining at least one operator usage state and at least one operator pruning condition;
  executing at least a portion of the query plan including the first pipeline and the first join operator;
  detecting, based on the at least one operator usage state and the at least one operator pruning condition, an empty state object shared between the first join operator and the second join operator in the second pipeline;
  processing, by the at least one operator pruning condition, an indication of the empty state object, wherein the least one operator pruning condition is associated with the second join operator and includes at least a first rule to mark the second join operator for pruning, and marking the second join operator for pruning.

Example 20: The non-transitory computer-readable storage medium of Example 19 further comprising: receiving a query, wherein in response to the received query, the query plan is generated.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
  executing, by at least one processor, at least a portion of a query plan including a first pipeline and a first join operator, wherein the query plan further includes in a second pipeline a second join operator, and wherein the query plan defines at least one operator usage state and at least one operator pruning condition;
  detecting, by the at least one processor and based on the at least one operator usage state and the at least one operator pruning condition, an empty state object shared between the first join operator and the second join operator in the second pipeline;
  processing, by the at least one processor and based on the at least one operator pruning condition, an indication of the empty state object, wherein the at least one operator pruning condition is associated with the second join operator and includes at least a first rule to mark the second join operator for pruning; and
  marking, by the at least one processor, the second join operator for pruning.

2. The method of claim 1, further comprising:
  receiving, via the at least one processor, a query, wherein in response to the received query, the query plan is generated.

3. The method of claim 1, wherein the at least one operator usage state identifies the state object shared between the first join operator and the second join operator.

4. The method of claim 3, wherein the at least one operator usage state indicates whether usage of the state object is read-only or read-write.

5. The method of claim 1, wherein the at least one operator pruning condition indicates one or more conditions under which the second join operator can be pruned.

6. The method of claim 5, wherein the at least one pruning condition indicates the first join operator as a source operator, a function that identifies whether the state object is empty, and a list of target operators to be pruned based on the function.

7. The method of claim 1, further comprising using, by the at least one processor, one or more rules to prune at least the second join operator.

8. The method of claim 7, wherein the one or more rules include one or more of a direct pruning rule, a forward pruning rule, and a backward pruning rule.

9. The method of claim 1, wherein at least one database execution engine including the at least one processor performs the executing, the detecting, the processing, and the marking.

10. A system comprising:
  at least one processor; and
  at least one memory including instruction which when executed by the at least one processor causes operations comprising:
    executing at least a portion of a query plan including a first pipeline and a first join operator, wherein the query plan further includes in a second pipeline a second join operator, and wherein the query plan defines at least one operator usage state and at least one operator pruning condition;
    detecting, based on the at least one operator usage state and the at least one operator pruning condition, an empty state object shared between the first join operator and the second join operator in the second pipeline;
    processing, by the at least one operator pruning condition, an indication of the empty state object, wherein the at least one operator pruning condition is associated with the second join operator and includes at least a first rule to mark the second join operator for pruning; and
    marking the second join operator for pruning.

11. The system of claim 10, further comprising:
  receiving a query, wherein in response to the received query, the query plan is generated.

12. The system of claim 10, wherein the at least one operator usage state identifies the state object shared between the first join operator and the second join operator.

13. The system of claim 12, wherein the at least one operator usage state indicates whether usage of the state object is read-only or read-write.

14. The system of claim 10, wherein the at least one operator pruning condition indicates one or more conditions under which the second join operator can be pruned.

15. The system of claim 14, wherein the at least one pruning condition indicates the first join operator as a source operator, a function that identifies whether the state object is empty, and a list of target operators to be pruned based on the function.

16. The system of claim 10, further comprising using one or more rules to prune at least the second join operator.

17. The system of claim 16, wherein the one or more rules include one or more of a direct pruning rule, a forward pruning rule, and a backward pruning rule.

18. The system of claim 10, wherein at least one database execution engine performs the executing, the detecting, the processing, and the marking.

19. A non-transitory computer-readable storage medium including instruction which when executed by at least one processor causes operations comprising:
   executing at least a portion of a query plan including a first pipeline and a first join operator, wherein the query plan further includes in a second pipeline a second join operator, and wherein the query plan defines at least one operator usage state and at least one operator pruning condition;
   detecting, based on the at least one operator usage state and the at least one operator pruning condition, an empty state object shared between the first join operator and the second join operator in the second pipeline;
   processing, by the at least one operator pruning condition, an indication of the empty state object, wherein the at least one operator pruning condition is associated with the second join operator and includes at least a first rule to mark the second join operator for pruning; and
   marking the second join operator for pruning.

20. The non-transitory computer-readable storage medium of claim 19, further comprising:
   receiving a query, wherein in response to the received query, the query plan is generated.

* * * * *